United States Patent [19]

Verreault

[11] Patent Number: 4,836,685

[45] Date of Patent: Jun. 6, 1989

[54] PROCESS AND AN APPARATUS FOR MIXING SUBSTANCES

[75] Inventor: Laurent Verreault, Quebec, Canada

[73] Assignee: Le Groupe Laperriere & Verreault, Inc., Trois Riviere, Canada

[21] Appl. No.: 76,904

[22] Filed: Jul. 23, 1987

[30] Foreign Application Priority Data

Jul. 8, 1987 [CA] Canada .................................. 541608

[51] Int. Cl.[4] ...................... B01F 15/04; G05D 11/04; G01G 13/02; G01G 17/06

[52] U.S. Cl. ...................................... 366/141; 222/56; 222/77; 366/152; 366/160; 366/189; 364/502

[58] Field of Search ............... 366/141, 152, 153, 160, 366/189, 132; 222/56, 77; 177/116; 162/252, 348; 137/10, 403; 364/479, 502

[56] References Cited

U.S. PATENT DOCUMENTS

| | | | |
|---|---|---|---|
| 2,264,562 | 12/1941 | Bryant et al. | 177/116 X |
| 2,343,454 | 3/1944 | Harnett | 366/141 |
| 3,133,726 | 5/1964 | Tarukawa | 222/56 X |
| 3,271,241 | 9/1966 | Mumme | 366/153 X |
| 4,225,248 | 9/1980 | Para | 366/251 |
| 4,353,482 | 10/1982 | Tomlinson | 222/1 |
| 4,403,866 | 9/1983 | Falcoff | 366/132 |
| 4,427,298 | 1/1984 | Fahy | 366/132 |
| 4,544,279 | 10/1985 | Rudolph | 366/141 X |
| 4,581,704 | 4/1986 | Mitsukawa | 364/479 |
| 4,725,149 | 2/1988 | Kawakami et al. | 366/141 |

*Primary Examiner*—Harvey C. Hornsby
*Assistant Examiner*—Scott J. Haugland
*Attorney, Agent, or Firm*—Cushman, Darby & Cushman

[57] ABSTRACT

The present invention relates to a process and an apparatus for blending substances in a highly accurate manner. The process consists of delivering an amount of a first substance into a mixing vessel and determining the weight of the amount of the first substance actually delivered. From the weight measured and the proportion of a second substance in the final blend an amount of the second substance is calculated and discharged in the mixing vessel, and same for each additional substance.

6 Claims, 2 Drawing Sheets

PROCESS AND AN APPARATUS FOR MIXING SUBSTANCES

FIELD OF THE INVENTION

The present invention relates in general to a method and an apparatus for blending substances to provide an accurately proportioned mixture. The invention can advantageously be applied for the preparation of paper coloring solutions.

BACKGROUND OF THE INVENTION

There are a number of applications in which substances must be blended in a highly accurate manner. This is particularly true in the paper industry where coloring solutions are prepared by mixing colorants and a diluting agent for treating newsprint to obtain the desired finished color, as the natural paper has a yellowish hue which is unpleasant to the eye.

The traditional method of preparing the paper coloring solution involves mixing highly concentrated color pigments with a diluting agent such as water in a carefully controlled ratio. The mixture is then metered on to the paper. Hue variations in the end product will result if the mixing or the application of the coloring solution to the paper is inconsistent. The dosage of the color pigments is the most delicate step in the mixing operation due to the high ratio of water to color pigments; a small error in the quantity of the pigments results in large color shifts in the final product.

Devices, available on the market, for preparing paper coloring solutions employ variable flow-rate metering pumps for dosing the color pigments. Due to the relatively small quantity of pigments required for preparing a batch of a coloring solution, it has been found that the metering pumps are not sufficiently accurate for delivering the exact quantity of pigments required and, therefore, color variations from one batch to another are almost inevitable.

OBJECT AND STATEMENT OF THE INVENTION

Therefore, an object of this invention is an improved method and an apparatus to blend substances to provide an accurately proportioned mixture.

A more specific object of the invention is an improved method and an apparatus for mixing color pigments and a diluting agent to form a paper coloring solution.

Broadly, the method according to this invention comprises the step of delivering into a mixing vessel an amount of one of the components of the mixture to be formed and from the actual weight of the material in the mixing vessel rather than from the desired weight, the amount of another component of the mixture is determined and added in the vessel. This step may be repeated for each component of the mixture.

More specifically, for preparing a coloring solution according to this process involves, in a preferred embodiment, discharging approximately 50% of the quantity of diluting agent required, such as water, into the mixing vessel and then weighing the vessel to determine the exact quantity of water which has been delivered. According to the weight measured and the formula for preparing the coloring solution the quantity of color pigments is calculated and added in the vessel. The latter is then weighed again to determine the actual amount of pigments delivered and the quantity of water necessary to complete the solution is calculated accordingly and then added.

The apparatus for carrying out this process preferably comprises a mixing vessel, a computer connected to and controlling a multiplicity of positive displacement pumps that are each individually connected to a supply of components for making the coloring solution. The mixing vessel is connected to a load cell for generating a signal representative of the weight of material in the vessel, the signal being used by the computer to calculate the amount of a component to be added and signals a pump to add the component.

While the process and the apparatus of this invention are specifically described with relation to the preparation of coloring solutions for treating paper, it should be plain to those skilled in the art that other types of mixtures may be prepared according to this method without departing from the spirit of the invention.

Therefore, the present invention comprises in a general aspect a process for blending in a predetermined ratio at least two different substances, namely a first substance and a second substance, the process comprising the steps of:

delivering an amount of a first substance in a mixing vessel;

determining the weight of the amount of the first substance delivered in the mixing vessel;

according to the weight of the amount of the first substance and the ratio between the first substance and the d substance, calculating an amount of the second substance to be delivered in the mixing vessel; and adding in the mixing vessel the amount of the second substance calculated at the preceeding step.

The invention also comprehends an apparatus for preparing a paper coloring solution by blending in accordance with a certain formula first and second substances, namely color pigments and a diluting agent, and for delivering the coloring solution to a paper machine, the apparatus comprising:

a mixing vessel for preparing a batch of the coloring solution;

a storage tank for the coloring solution;

first conduit means establishing a first fluid path from the mixing vessel to the storage tank to discharge a batch of coloring solution from the mixing vessel to the storage tank;

flow control means in the first fluid path;

second conduit means establishing a second fluid path from the storage tank to the paper machine for supplying coloring solution to the paper machine;

first weighting means operatively connected to the mixing vessel for generating a first signal representative of the weight of material present in the mixing vessel;

second weighing means operatively connected to the storage tank for generating a second signal representative of the weight of material present in the storage tank;

discharge means adapted to be connected to a supply of color pigments and diluting agent, the discharge means being in fluid communication with the mixing vessel for selectively discharging therein controlled amounts of color pigments and diluting agent;

electronic controller means in operative relation with the first and second weighing means, with the flow control means and with the discharge means, the electronic controller comprising:

(a) memory means in which is stored the formula; and (b) calculating means, the controller means receiving the second signal and signaling the discharge means to deliver in the mixing vessel an amount of the first substance when the second signal indicates that the quantity of coloring solution in the storage tank is below a predetermined level, the controller means receiving the first signal and determining the weight of the amount of the first substance actually delivered in the mixing vessel, from the weight of the first substance actually delivered in the mixing vessel and from the formula stored in the memory means, the calculating means calculating an amount of the second substance to be delivered in the mixing vessel, the controller means signaling the discharge means to deliver in the mixing vessel an amount of the second substance in accordance with the calculated amount of the second substance in the previous step, upon completion of a batch of coloring solution in the mixing vessel, the controller means signaling the flow control means to enable discharge of the batch of coloring position in the storage tank.

BRIEF DESCRIPTION OF THE DRAWINGS

A preferred embodiment of this invention will now be described with relation to the annexed drawings in which.

DESCRIPTION OF A PREFERRED EMBODIMENT

Figure 1:
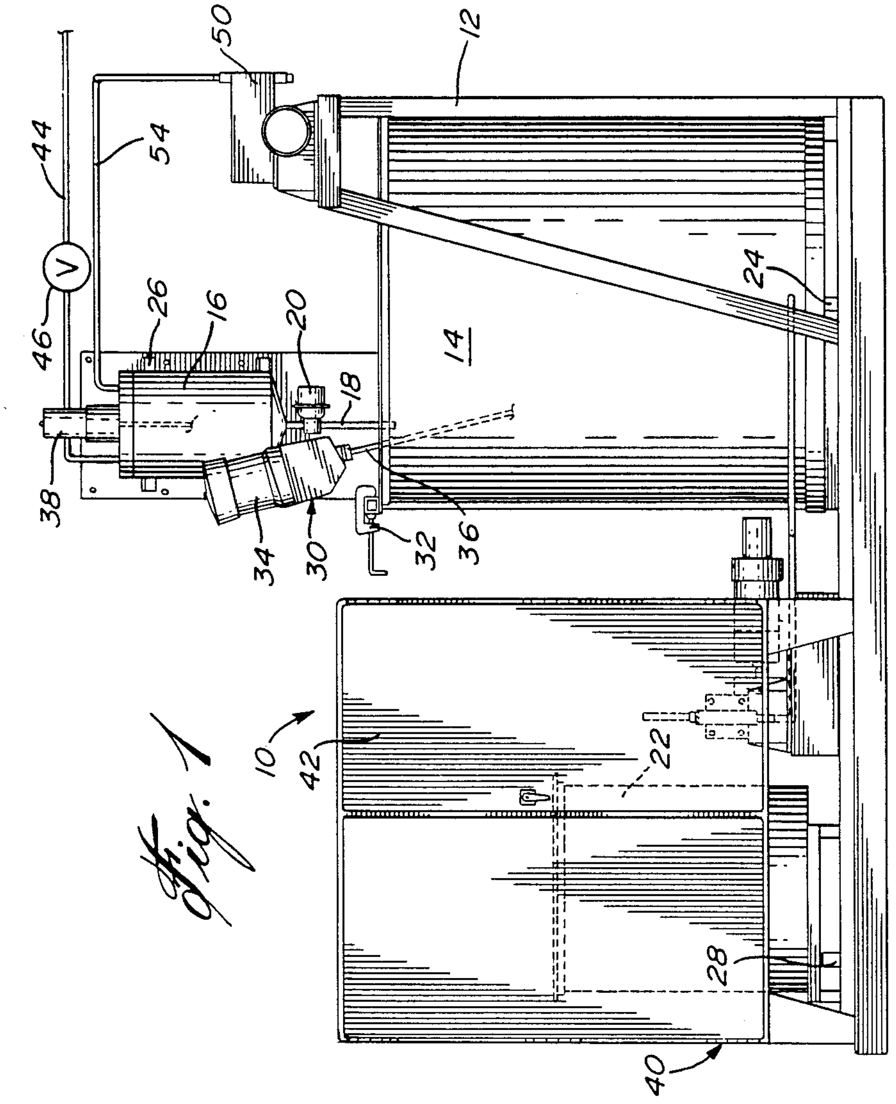
FIG. 1 is an elevational view of an apparatus according to the invention.
Figure 2:
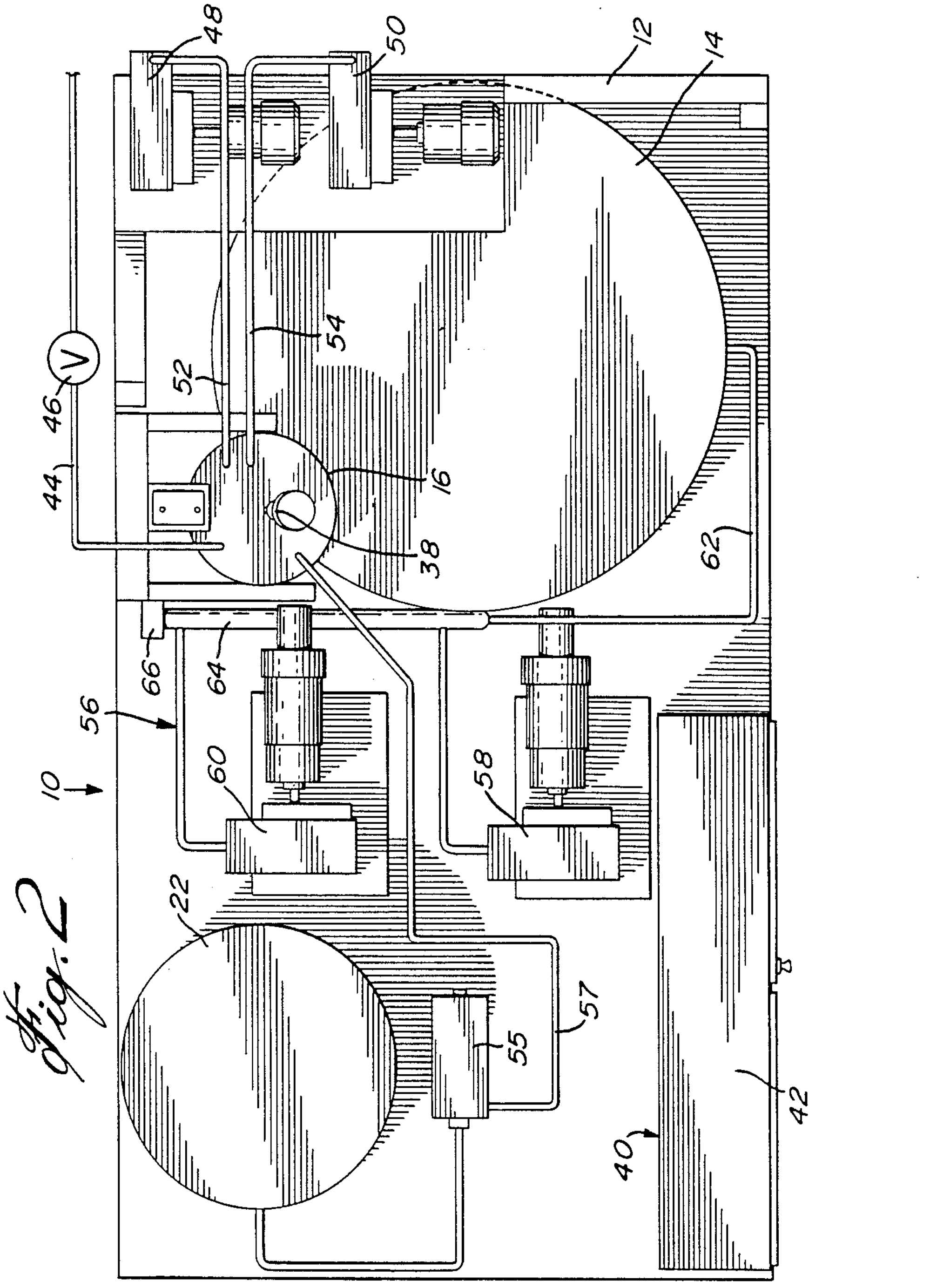
FIG. 2 is a top plan view of the apparatus shown in FIG. 1.

The apparatus illustrated in FIGS. 1 and 2 is used for continuously preparing a coloring solution for treating paper and for metering the coloring solution in the fan pump of a conventional paper making machine. More specifically, the apparatus identified generally by the reference numeral 10 comprises a main frame 12 constituted by hollow metallic beam members connected to each other by welding or in any other appropriate manner.

On the frame 12 is mounted a cylindrical main storage tank 14 having a capacity of approximately 650 U.S. gallons. Directly above the main storage tank 14 is mounted a smaller mixing vessel 16 of approximately 18 U.S. gallons, in which color pigments and water are mixed to form the coloring solution which is discharged in the main storage tank 12 by means of a conduit 18. The flow of fluid in the conduit 18 is controlled by a motorized valve 20 of a type well known in the art.

A tank 22 for containing acid and having approximately a capacity of 90 U.S. gallons is mounted on the frame 12, adjacent the main storage tank 14. As it will be more fully described hereinafter, the acid tank 22 is mainly used during the cleaning procedures of the apparatus 10.

The main storage tank 14, the mixing vessel 16 and the acid tank 22 are supported by load cells 24, 26 and 28, respectively, of the type adapted to generate an electrical signal representative of the weight of material in each tank. As an example, the following commercially available load cells have been found satisfactory for use with the apparatus 10.

| TANK | LOAD CELL |
|---|---|
| (1) main storage tank | Interface SSM-AJ-2000, SN 64116 |
| (2) mixing tank | Interface SSSM-AJ-100 SN 66459 |
| (3) acid tank | Interface SSM-AJ-500, SN 64165 |

A main agitator assembly 30 (omitted from FIG. 2) is mounted by means of a clamp 32 on the main frame 12. The main agitator asssembly 30 comprises an electrical motor 34 driving an elongated shaft 36 extending deeply in the storage tank 14 and carrying at its lower end a plurality of mixing blades (not shown). A similar, but smaller agitator assembly 38 is mounted on the main frame 12, aside of the mixing vessel 16.

An electronic device 40 for controlling the operation of the apparatus 10 is mounted on the frame 12 and it is housed in an industrial type metallic cabinet 42. The electronic control device 40 comprises a P.L.C. (Programmable Logical Controller) which may be any appropriate commercially available P.L.C. provided with a sufficient number of I/O ports to receive signals from the load cells 24, 26 and 28, and from any other sensor which may be installed on the apparatus 10, and in return send the appropriate commands to the various pumps and valves of the apparatus 10 to enable a fully automatic operation. As an example the PLC-2/15 (No 1771-LV) programmable processor manufactured by Allen-Bradley, which is capable of controlling up to 128 I/O devices has been found satisfactory to use with the apparatus 10.

To enable the operator of the apparatus 10 to access the P.L.C. for entering data or for operating the apparatus 10 in a manual mode when required, the control device 40 is provided with a control panel including thumb wheel switches, display units and a mimic-style layout. Preferably, four BCD thumbwheels (3 digits) wired in parallel to the multiplexer input module of the computer are used to provide data to the computer, such as the batching formula of the coloring solution, level of paper coloring solution to be maintained in the main storage tank 14, or any other information. Generally, this type of control hardware is well known in the art and it will not be described in detail here.

To deliver the components necessary for the preparation of the coloring solution in the mixing vessel 16, the apparatus 10 includes a water conduit 44 (shown in FIG. 2) connected to a source of pressurized water and leading to the mixing vessel 16. The water flow in the conduit 44 is controlled by a solenoid valve 46.

Color pigments are supplied in the mixing vessel 16 from storage tanks by positive displacement pumps 48 and 50, each pump being used for a different type of color pigments. However, as it will be plain to a man skilled in the art, the apparatus 10 may be so constructed to have provisions for mixing more or less than two types of pigments to suit any particular application.

The color pigments are discharged from the pumps 48 and 50 to the mixing vessel 16 through conduits 52 and 54, respectively.

Typically, color pigments are supplied by manufacturers in throw-away dispensers of various sizes, with screw cap. The supply pumps 48 and 50 communicate with the dispensers by small plastic tubes dipping into the pigments. The tubes are removable and are thrown away with the empty dispensers to avoid handling hazards since the color pigments can heavily stain the human skin.

Acid contained in the tank 22 can be discharged in the mixing vessel 16 by a pump 55 and a conduit 57.

The coloring solution contained in the main storage tank 14 is continuously metered into the fan pump of the paper making machine by a pumping assembly 56 comprising a pair of positive displacement pumps 58 and 60, one of the pumps giving redundancy. Coloring solution is drawn from the main storage tank 14 by a conduit 62 and is supplied to the paper making machine via a discharge conduit 64. The pumping assembly 56 is provided with a flow detector 66 for continuously monitoring the flow of coloring solution in the conduit 64.

The various pumps, the load cells, the valve 46 and the flow detector 66 of the apparatus 10 are electrically connected to the electronic control device 40 by conventional wiring.

The operation of the apparatus 10 is as follows.

The apparatus 10, as mentioned earlier is adapted to automatically and continuously prepare and supply coloring solution to the fan pump of a paper making machine. At this end, the main storage tank 14 always contains a certain quantity of coloring solution which is metered in the fan pump by the pumping assembly 56. The amount of solution in the tank 14 is measured by the load cell 24 which sends an electrical signal to the control device 40. Should the quantity of coloring solution in the tank 14 fall below a predetermined level, the electronic control device generates the appropriate signals for preparing a new batch of the coloring solution.

The batch recipe or formula of the paper coloring solution is stored in the memory of the computer and may be modified as desired through the control panel of the electronic control device 40.

When the batch formula has been set, the electronic control device opens the valve 46 until the net weight of water in the mixing vessel 16 reaches 50% of the recipe weight of water. The valve 46 is then closed. The net weight of water actually discharged is measured by the load cell 26 and stored in the memory of the computer of the control device 40.

According to the formula of the coloring solution and the net weight of water discharged, a calculator in the control device 40 calculates the amount of color pigments to be delivered in the mixing vessel 16. Then, the pump 48 is actuated until the load cell indicates that the desired quantity has been discharged in the mixing vessel. The weight of material in the mixing vessel is measured and the net weight of pigments is determined by subtracting from the weight of material in the mixing vessel the weight of water previously measured.

The above step is repeated for each type of color pigment to be delivered in the mixing vessel 16.

At last, according to the formula of the coloring solution and the net weight of the various substances discharged in the mixing vessel, the control device 40 calculates how much water is necessary to complete the preparation of the solution. The valve 46 is then opened until the load cell 26 signal that the desired quantity of water has been delivered.

The agitator assembly 38 is actuated for a predetermined period of time to mix the solution. After this step has been completed, the valve 20 is opened to empty the contents of the mixing vessel 16 in the main storage tank 14.

The agitator assembly 30 is actuated from time to time to stir the contents of the main storage tank 14.

The control device 40 continually monitors the flow of coloring solution by means of the flow monitor 64. Should the flow of solution fall below a predetermined level for any reason, the alternate pump of the pumping system 56 is switched in.

When the apparatus 10 is shut down for maintenance or for any other reason, to avoid coloring solution remaining in the various tanks and conduits to dry and clog them, acid from the tank 22 is pumped to flush the system. More particularly, acid is pumped by the pump 55 in the mixing vessel 16, the main storage tank 14 and the pumping assembly 56. If desired, the appropriate piping may be provided to circulate acid in the other conduits of the apparatus 10 as well. Preferably, a closed loop acid cleaning system should be provided to avoid pollution caused by dumping. After several cleaning cycles, the acid is dissipated by injecting minute quantities of acid into each batch of coloring solution until the acid tank 22 is empty.

The piping of the closed loop cleaning system will not be described in details here since it is not essential to the invention and the design and construction of such piping system is well within the reach of a man skilled in the art.

Although the invention has been described with relation to a specific form, it will be evident for a person skilled in the art that it may be refined and modified in various ways. It is therefore, wished to have it understood that the present invention should not be limited in interpretation except by the terms of the following claims.

I claim:

1. An apparatus for preparing a paper coloring solution by blending in accordance with a certain formula first and second substances, namely color pigments and a diluting agent, and for delivering said coloring solution to a paper machine, said apparatus comprising:

a mixing vessel for preparing a batch of said coloring solution;

a storage tank for said coloring solution;

first conduit means establishing a first fluid path from said mixing vessel to said storage tank for discharging a batch of coloring solution from said mixing vessel in said storage tank;

flow control means in said first fluid path;

second conduit means establishing a second fluid path from said storage tank to said paper machine for supplying coloring solution to said paper machine;

first weighing means operatively connected to said mixing vessel for generating a first signal representative of the weight of material present in said mixing vessel;

second weighing means operatively connected to said storage tank for generating a second signal representative of the weight of coloring solution in said storage tank;

discharge means adapted to be connected to a supply of color pigments and of diluting agent, said discharge means being in fluid communication with said mixing vessel for selectively discharging therein controlled amounts of color pigments and diluting agent;

electronic controller means in operative relation with said first and second weighing means, with said flow control means and with said discharge means, said electronic controller means comprising:

(a) memory means in which is stored said formula; and (b) calculating means, said controller means receiving said second signal and signaling said discharge means to deliver in said mixing vessel an amount of said first substance when said second signal indicates that the quantity of coloring solution in said storage tank is below a predetermined level, said controller means receiving said first signal and determining the weight of said amount of said first substance actually delivered in said mixing vessel, from the weight of said first substance actually delivered in said mixing vessel and from said formula stored in said memory means, said calculating means calculating an amount of said second substance to be delivered in said mixing vessel, said controller means signaling said discharge means to deliver in said mixing vessel an amount of said second substance in accordance with the calculated amount of said second substance in the previous step, upon completion of a batch of coloring solution in said mixing vessel, said controller means signaling said flow control means to enable discharge of said batch of coloring solution in said storage tank.

2. An apparatus as defined in claim 1, further comprising a tank for a cleaning agent and a third conduit means for establishing a third fluid path from said tank for a cleaning agent and said mixing vessel.

3. An apparatus as defined in claim 2, wherein said cleaning agent is acid.

4. An apparatus as defined in claim 2, further comprising pump means in said third conduit means.

5. An apparatus as defined in claim 1, further comprising pump means in said second fluid path for metering coloring solution from said storage tank to said paper machine.

6. An apparatus as defined in claim 1, further comprising agitator means in said mixing tank and in said storage tank.

* * * * *